Sept. 22, 1953  J. C. CHENETTE ET AL  2,653,033
HAND TRUCK WITH AJUSTABLE TOE PLATE
Filed Feb. 17, 1950  3 Sheets-Sheet 3

Inventors
Joseph C. Chenette
Edmond Z. Chenette
By Wilfred E. Lawson
Attorney

Patented Sept. 22, 1953

2,653,033

UNITED STATES PATENT OFFICE 2,653,033

HAND TRUCK WITH ADJUSTABLE TOE PLATE

Joseph C. Chenette and Edmond Z. Chenette, Harlingen, Tex.

Application February 17, 1950, Serial No. 144,754

6 Claims. (Cl. 280—44)

This invention relates to hand trucks for industrial purposes, such as moving boxes, barrels, drums and other articles awkward to handle.

The primary object of the invention is to provide an industrial hand truck the main frame of which is adapted to be adjusted at different predetermined angles in relation to the toe plate of the truck to facilitate the loading, moving and unloading of differently packaged loads.

Another object of the invention is to provide a hand truck of the character indicated above, in which the distance between the wheel axle and the main frame is adjustable.

A further object of the invention is to provide a hand truck of the character indicated above and equipped with a grab hook for engaging the upper end portion of a load arranged on the truck.

An additional object of the invention is to provide a hand truck of the character indicated above, the grab hook of which is mounted adjustably on a member of the main frame.

The invention consists in the details of construction and in the combination and arrangement of the several parts of my improved hand truck whereby certain advantages are attained, as will be hereinafter more fully set forth.

In order that our invention may be better understood, we will now proceed to describe the same with reference to the accompanying drawings, wherein:

Figure 4 is a view in section taken on line 4—4 of Figure 2;

Figure 5 is a view in section taken substantially on the line 5—5 of Figure 1; and Figure 6 is a detail view in section taken substantially on the line 6—6 of Figure 1 but showing the members usually located in the tubular frame member secured in raised position.

Figure 1:
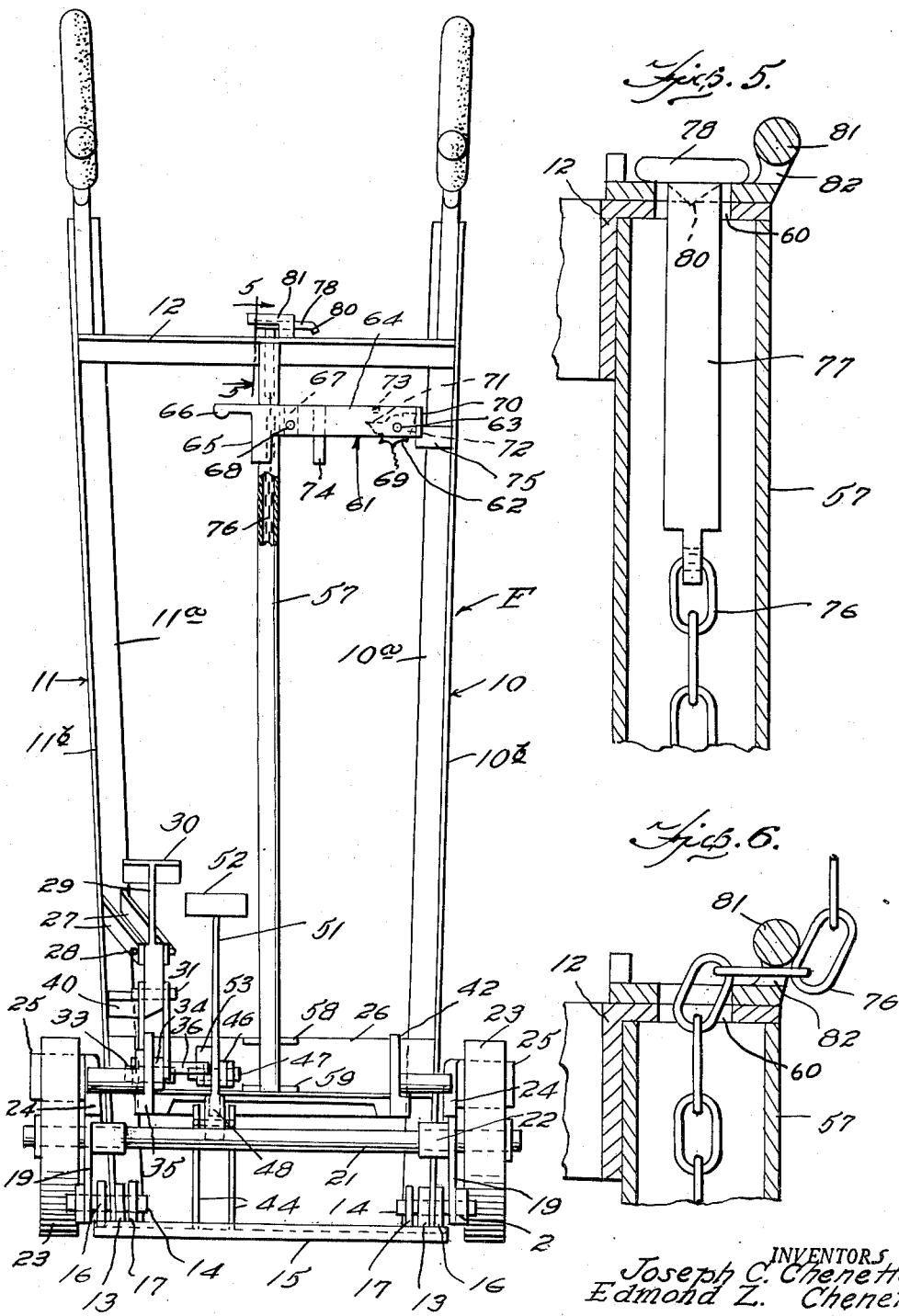
Figure 1 is a rear view in elevation of a preferred embodiment of the hand truck in accordance with the present invention, a portion of a central frame member being broken away.
Figure 2:
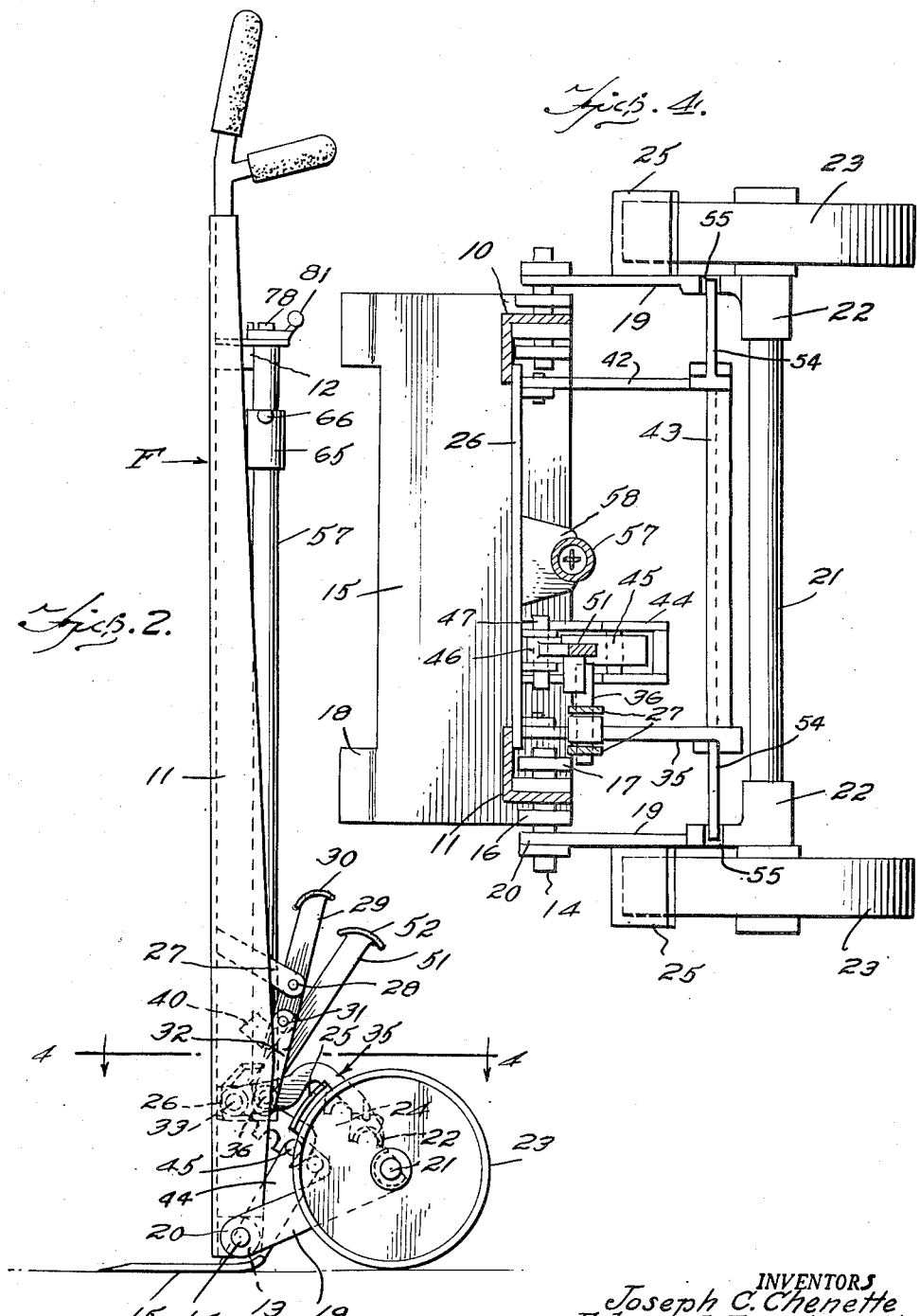
Figure 2 is a side view in elevation.

The industrial hand truck as herein embodied comprises a main frame F having two side members 10 and 11 respectively spaced from each other and connected with each other by means of a transverse member 12. The members 10, 11 and 12 have preferably rectangular cross sections and side members 10 and 11 have front flanges 10a and 11a respectively from the outer edges of which the side flanges 10b and 11b respectively extend rearwardly. The transverse member 12 is welded or otherwise secured to the side members 10 and 11 adjacent to the upper end thereof so that one of the flanges of the transverse member 12 extends rearwardly from the upper edge of the other flange.

On the inner surface of each side flange 10b and 11b respectively a boss 13 is formed adjacent to the lower end of each side member 10 and 11 and a pivot pin 14 extends axially through each boss 13 and beyond the outer surface of the side flanges 10b and 11b respectively.

Figure 3:
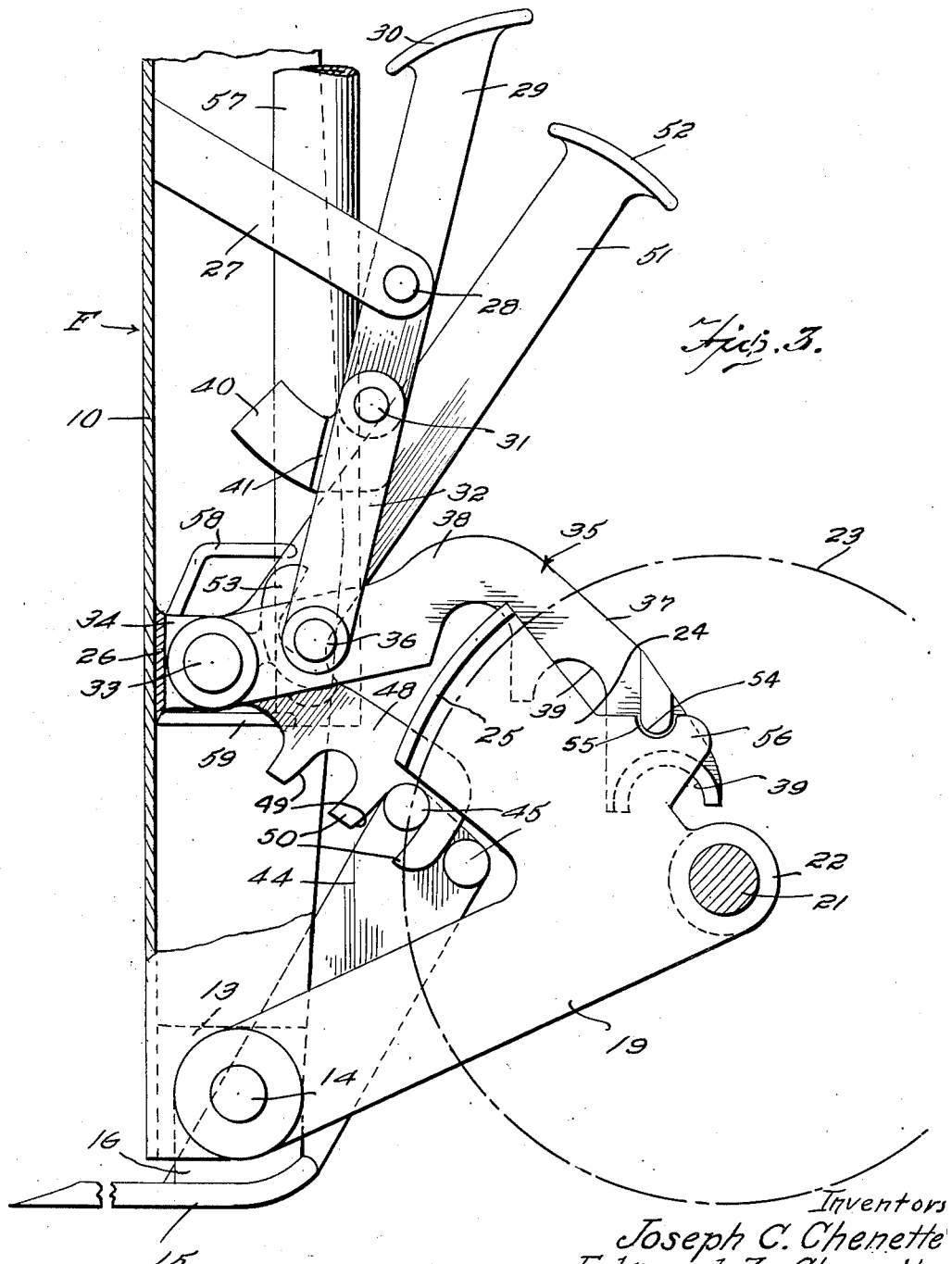
Figure 3 is a detail side view in elevation of the lower portion of Figure 2 one flange of the rear angle iron of the main frame being partly cut away.

A toe plate 15 has a substantially rectangular shape and a transverse hinge lug 16 extends upwardly from said toe plate adjacent to each rear corner thereof. The size of the toe plate 15 is such that one of the hinge lugs 16 is disposed outside of and adjacent to the lower outside surface of the side member 10 and the other lug is located alongside of the other side member 11. A second pair of transverse hinge lugs 17 is formed on the toe plate 15 and each lug 17 is spaced from the adjacent lug 16 so that the lug 17 is disposed adjacent to and inwardly of the boss 13. Each pivot pin 14 extends through one pair of hinge lugs 16 and 17 so that the toe plate 15 is attached pivotally to the frame F and extends forwardly beyond the front flanges 10a and 11a of the side members 10 and 11. On the front edge of the toe plate 15 adjacent to each transverse edge of said plate a forwardly extending projection 18 is formed the upper surface of which is bevelled as shown best in Figure 3.

Each pivot pin 14 extends outwardly beyond the outer hinge lug 16 and a lever arm 19 is pivotally mounted on each pivot pin 14 outside of the adjacent hinge lug 16. An annular boss 20 is formed on each lever arm 19 and surrounds the pivot pin 14.

An axle 21 extends through the two lever arms 19 and on the inside surface of each lever arm 19 a boss 22 is formed surrounding the axle 21 and forming a bearing therefor. The axle 21 extends beyond the lever arms 19 and on each axle portion projecting beyond said lever arms a truck wheel 23 is rotatably mounted so that the lever arm 19 extends rearwardly and upwardly from the pivot pin 14.

From the upper rear edge portion of the lever arm 19 another lever arm 24 extends upwardly and forwardly at an acute angle to the first lever arm 19. Each lever arm 24 extends slightly beyond the rim of the adjacent truck wheel 23 and on the outer end portion of each lever arm 24 a wheel guard 25 is formed extending outwardly from the lever arm 24 over the wheel 23.

A transverse bracket plate 26 extends between the side members 10 and 11 and is secured to said members in any suitable manner, for instance, by welding, at a level above the axle 21. Each of a pair of bracket arms 27 is secured with one of its end portions to the side member 10 and the two bracket arms are spaced from each other and extend rearwardly and downwardly parallel to each other. They are disposed at a higher level than the upper edge of the bracket plate 26. A pivot pin 28 extends through the two bracket arms 27 adjacent to their free ends and parallel to the front flange 10a.

A pedal lever 29 is pivotally mounted intermediate its ends on the pivot pin 28 and is provided on its upper end with a plate 30 adapted to be engaged by a foot of an operator. Adjacent to the lower end of the pedal lever 29 a pivot pin 31 extends through said pedal lever and a pair of lever arms 32 are pivotally mounted on said pin, one adjacent to each end thereof.

Another pivot pin 33 is supported by a bearing bracket 34 formed on or secured to the bracket plate 26 and extending rearwardly therefrom. An adjusting arm 35 is pivotally mounted adjacent to one of its ends on said pin 33 and extends rearwardly therefrom. It is disposed so that it extends between the lower end portions of the lever links 32 and a pivot pin 36 extending through said end portions of said lever links and through the adjusting arm 35 adjacent to the pivot pin 33 connects the arm 35 pivotally with the lever links 32.

The rear end portion 37 of the arm 35 extends downwardly at an angle to the front end portion 38 of said arm and a plurality of notches 39 are provided in the underside of the rear end arm portion 37 and are adapted to engage the axle 21. To urge said notches 39 selectively into engagement with the axle 21 a weight 40 is arranged on the front surface of the portion 41 of the pedal lever 29 extending below the pivot pin 31. This weight 40 urges the pedal lever 29 to pivot rearwardly about the pivot pin 28 so that the pedal lever 29 and the lever links 32 are disposed in a straight alinement with each other, pivoting the adjusting arm 35 into engagement with the axle 21. When the angular arrangement of the frame F is to be changed the pedal lever 29 is pivoted by stepping on the pedal plate 30. Thereby the lever links 32 are lifted so that the adjusting arm 35 is also lifted disengaging it from the axle 21, and permitting the frame F to be pivoted into the desired angular position. The weight 40 forces the selected notch 39 into engagement with the axle 21, when the foot is lifted from the pedal plate 30.

To reinforce the connection between the frame F and the axle 21, a second adjusting arm 42 is pivotally secured to the bracket plate 26. It is shaped similar to the adjusting arm 35 and is provided with notches similar to the notches 39. The two adjusting arms are connected with each other by means of a strip of metal or a bar 43 so that the arm 42 will be actuated simultaneously with the arm 35.

A pair of stop levers 44 are secured or formed on the toe plate 15 adjacent to the rear edge thereof and inwardly from the inner hinge lug 17 located to the side frame 10. The two stop levers 44 extend upwardly and rearwardly from the toe plate 15 and stop below the level of the wheel guard 25. Between the upper corners of the two stop levers 44 a pair of stop pins 45 are arranged.

A bracket bearing 46 is secured or formed on the rear surface of the bracket plate 26 and a pivot pin 47 is pivotally supported by said bracket bearing 46. A second adjusting arm 48 is firmly mounted on said pivot pin 47 and is provided in its under edge with a plurality of notches 49 forming teeth 50 on said arm 48. Said teeth are of such size and shape and are spaced from each other so that they can enter between the stop pins 45 and the notches 49 can engage the stop pins 45.

A second pedal lever 51 having on its upper end a pedal plate 52 is firmly mounted on the pivot pin 47 and extends upwardly and rearwardly so that the pedal plate 52 is disposed below and to one side of the pedal plate 30.

On the side of the pedal lever 51 nearer to the pedal lever 29 a lug 53 is formed and extends over the end portion of the pivot pin 36 extending beyond the inner lever link 32, so that said pivot pin end portion engages the lug 53 when the first named adjusting arm 35 is pivoted upwardly by the pedal lever 29. The second pedal lever 51 is then pivoted forwardly whereby the second adjusting arm 48 is lifted so that the two stop pins 45 are disengaged from the second adjusting arm 48 when the pedal plate 30 is urged all the way down. This permits adjustment of the frame F in relation to the toe plate 15. When the desired adjustment is made the foot is lifted from the pedal plate 30, the weight 40 returns the pedal lever 29 and the lever links 32 into alined position whereby the adjusting arm is lowered into position to engage the axle 21 and the adjusting arm 48 is lowered into position to engage the stop pins 45.

In order to secure the frame F in position to extend at susbtantially right angles to the toe plate 15, the pedal plate 30 is forced all the way down, as described above, the frame F is pivoted about the pivot pins 14 into the desired position and the pedal lever 29 is released. Weight 40 returns the pedal lever 29 and the lever links into alined position permitting the adjusting arm 35 to swing downwardly until a finger 54 engages a notch 55 formed in the upper edge of a lug 56 extending upwardly from the upper edge of the lever arm 24. At the same time the adjusting arm 48 engages the forward stop pin 45 so that the frame F is locked in upright position.

If it is desired to adjust the distance between the frame F and the axle 21 without changing the angular relation between the frame and the toe plate 15 the pedal plate 30 is engaged by the foot of the operator so that said foot extends laterally beyond said plate and will engage the pedal plate 52 which is disposed laterally from the pedal lever 29 and at a lower level than the pedal plate 30. When the foot of the operator comes into contact with the pedal plate 52 the downward movement of the pedal plate 30 is stopped. The adjusting arm 35 is disengaged from the axle 21 but the adjusting arm 48 is held in stop pin engaging position, whereby the position of the toe plate 15 in relation to the frame F is secured, but changing of the distance of the frame F from the axle 21 can be adjusted.

Centrally between the side frame 10 and 11 a longitudinal tubular frame member 57 is arranged and is secured to the transverse bracket plate 26 by means of a pair of brackets 58 and 59 formed on or secured to said plate adjacent to its upper and lower edge respectively and to the rearwardly extending flange of the transverse frame member 12, in which a hole 60 is provided in line with the tubular frame member 57, for the purpose hereinafter set forth.

A box hook construction 61 is slidably mounted on the tubular frame member 57 and comprises a cam shaped member 62 rotatably mounted on a pin 63 extending through the side members 64 of the frame of said box-hook construction adjacent to the outer ends of said side member. The side members 64 are connected at their inner ends by an end wall 65 surrounding the tubular frame member 57 and extending downwardly beyond the lower edges of the side members 64. A handle 66 extends diametrically outward from the upper marginal portion of the end wall 65. Diametrically opposite from the end wall 65 a partition 67 is disposed between the side members 64 and is secured thereto by a pin 68. The pin 63 for the cam shaped member is located adjacent the lower edges of the side members 64 and the cam shaped member 62 is provided with a plurality of clamping teeth extending outwardly from said member and inclined in clockwise direction. The lengths of said clamping teeth increase in clockwise direction so that the tooth 69 located next to the outer end wall 70 of the construction 61, when the member 62 is in idle position, is shorter than the other teeth and the tooth 71 located farther away from the tooth 69 than any other tooth is the longest.

The portion 72 of the cam shaped member 62 is the upper outer portion of said member when the same is arranged in idle position and is weighted so that it will return the cam shaped member 62 when the latter has been rotated counterclockwise. The weighted portion 72 rests normally against the outer end wall 70. A stop 73 is arranged between the two side members 64 adjacent to their upper edges and prevents the cam shaped member 62 from rotating farther in clockwise direction when the longest clamp tooth 71 extends downwardly from the pin 63. When the member 62 is in this position the weighted portion 72 of said member rests against the stop 73.

A finger 74 secured between the two side members 64, extends downwardly beyond their lower edges and is spaced from the tubular frame member 57.

On the side member 11 of the main frame F a hook stop 75 is provided adapted to prevent accidental pivotal movement of the hook construction 61 about the tubular frame member 57.

When the construction 61 is adjusted on the tubular member 57 the weight of the outer end portion of the construction will urge it against the tubular member 57 preventing accidental sliding movement.

When a box (not shown) is placed on the toe plate 15 the construction 61 is slid onto the box so that the cam shaped member 62 engages the box. When the box should slip accidentally from the toe plate 15 the cam shaped member 62 is rotated in counterclockwise direction forcing longer teeth onto the box and making it safer and safer on the toe plate.

When a barrel (not shown) is to be moved by a truck of the described kind it is placed between the two forwardly projecting portions 18 of the toe plate 15 and the top flange of the barrel is disposed so that the finger 74 engages the top of the barrel in front of its flange.

A chain 76 is disposed inside the tubular frame member 57 and one end link of said chain is secured to one end portion of a bar 77 adapted to be slid also into the tubular member through the hole 60 in frame member 12. On the top end of the bar 77 a cross bar 78 is fastened intermediate its ends. The cross bar 78 is comparatively wide and one of its end portions is bent down at an obtuse angle and is pointed as indicated in broken lines at 80 in Figure 5.

When a load which is too high to be held securely by means of the hook construction 61, or by hand, is to be secured on the truck, the chain 76 is pulled upwardly by the cross bar 78 and the bar 77 is placed flat on top of the load. The chain is fed out until the bar 77 can be placed across the top of the load and the pointed end portion 80 of the cross bar 78 grips the front of the load. The chain 76 is secured in the desired adjusted position by slipping one of the links of the chain under a short lock bar 81 formed on or secured to a bracket 82 extending upwardly from the top cross member 12 of the main frame F. In this manner unwieldly loads can be handled easily and securely on the truck described above.

From the foregoing description it is thought to be obvious that a hand truck constructed in accordance with our invention is particularly well adapted for use by reason of the convenience and facility with which it may be assembled and operated.

We claim:

1. A truck comprising a main frame, a toe plate hingedly connected with said main frame, cooperating means on the main frame and the toe plate for adjusting the frame and toe plate selectively at a predetermined angle to each other, said cooperating means comprising a pair of spaced apart stop levers secured to the toe plate and extending upwardly and rearwardly therefrom, a pair of stop pins extending between and secured to the upper corner portions of the stop levers, and an adjusting arm pivotally secured to and extending rearwardly from the main frame to turn on an axis extending transversely thereof, said adjusting arm being provided with a plurality of notches adapted to engage the stop pins selectively, and means for turning the adjusting arm disengaging said adjusting arm from its engagement with the stop pins.

2. A truck including a main frame, a pair of transverse pivot pins secured to the main frame, a toe plate hingedly secured to said pins, cooperating means on the toe plate and on the main frame for selectively securing the toe plate at one of a plurality of angles relative to the main frame, a pair of levers pivotally mounted on and extending rearwardly from the pivot pins, an axle supported by said levers, and an adjusting arm pivotally mounted on the main frame extending rearwardly therefrom and provided with a plurality of notches adapted to engage the axle to selectively adjust the main frame and the axle at predetermined distances from each other.

3. A truck including a main frame, a pair of pivot pins secured to the main frame, a toe plate hingedly secured to the pivot pins, cooperating means on the toe plate and on the main frame for selectively securing the toe plate at one of a plurality of angles relative to the main frame, a pair of levers pivotally mounted on and extending rearwardly from the pivot pins, an axle rigidly supported by said levers, an adjusting arm pivotally mounted on the main frame extending rearwardly therefrom and provided with a plurality of notches adapted to engage the axle to selectively adjust the main frame and the axle at predetermined distances from each other and means for releasing the adjusting arm from its engagement with the axle.

4. A truck including a main frame, a pair of pivot pins secured to the main frame, a toe plate hingedly secured to the pins, cooperating means on the toe plate and on the main frame for selectively securing the toe plate at one of a plurality of angles relative to the main frame, a pair of levers pivotally mounted on and extending rearwardly from the pins, an axle supported by said levers, an adjusting arm pivotally mounted on the main frame, extending rearwardly therefrom and provided with a plurality of notches adapted to engage the axle to selectively adjust the main frame and the axle at predetermined distances from each other, means for releasing the adjusting arm from the axle, said releasing means comprising a lever pivotally mounted on the frame and a connecting member pivotally secured to said lever and to the adjusting arm.

5. A truck including a main frame, a pair of pivot pins secured to the main frame, a toe plate hingedly secured to the pins, cooperating means on the toe plate and the main frame for selectively securing the toe plate at one of a plurality of angles relative to the main frame, a pair of lever arms mounted on and extending rearwardly from the shaft, an axle supported by said arms, an adjusting arm pivotally mounted on the main frame, extending rearwardly therefrom and provided with a plurality of notches adapted to engage the axle to selectively adjust the main frame and the axle at predetermined distances from each other, means for releasing the adjusting arm from the axle, said releasing means comprising an actuating lever pivotally mounted on the frame, a connecting member pivotally secured to said actuating lever and to the adjusting arm, the cooperating means comprising a pair of spaced apart stop levers on the toe plate, a pair of stop pins extending between and secured to the stop levers, an adjusting arm pivotally mounted on the main frame and provided with a plurality of notches adapted to selectively engage the stop pins, a lug on the last named adjusting arm, the first named adjusting arm being adapted to engage the lug during the continuation of axle releasing movement and to release the stop pin from its engagement with the second adjusting arm.

6. A truck as set forth in claim 5, the actuating lever of which is a pedal lever including a foot plate on said pedal lever, a second pedal lever pivotally mounted on the main frame, a foot plate on the second pedal lever, said foot plate being located in the path of a foot actuating the first pedal lever and extending laterally beyond the foot plate, a finger on the first adjusting arm, an upwardly and forwardly extending arm on each shaft supporting lever, a notched lug on said lever arms, said finger being adapted to engage said notched lug.

JOSEPH C. CHENETTE.
EDMOND Z. CHENETTE.

References Cited in the file of this patent
UNITED STATES PATENTS

| Number | Name | Date |
|---|---|---|
| 363,940 | Ash | May 31, 1887 |
| 635,037 | Buck | Oct. 17, 1889 |
| 1,050,602 | Bell et al. | Jan. 14, 1913 |
| 1,084,287 | Moore | Jan. 13, 1914 |
| 1,207,433 | Norman | Dec. 5, 1916 |
| 1,257,787 | Beum | Feb. 26, 1918 |
| 1,838,288 | Silvus | Dec. 29, 1931 |
| 2,160,556 | Miller | May 30, 1939 |
| 2,342,178 | Chenette | Feb. 22, 1944 |
| 2,392,955 | Stalcup | Jan. 15, 1946 |
| 2,447,300 | Williams | Aug. 17, 1948 |